US009805695B2

(12) United States Patent
Matsunaga et al.

(10) Patent No.: US 9,805,695 B2
(45) Date of Patent: Oct. 31, 2017

(54) DISPLAY APPARATUS, STORAGE MEDIUM HAVING STORED IN INFORMATION PROCESSING PROGRAM, INFORMATION PROCESSING APPARATUS, INFORMATION PROCESSING SYSTEM, AND IMAGE DISPLAY METHOD

(71) Applicant: NINTENDO CO., LTD., Kyoto (JP)

(72) Inventors: Hiroshi Matsunaga, Kyoto (JP); Yugo Hayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 424 days.

(21) Appl. No.: 13/724,525

(22) Filed: Dec. 21, 2012

(65) Prior Publication Data

US 2014/0098139 A1 Apr. 10, 2014

(30) Foreign Application Priority Data

Oct. 9, 2012 (JP) ................. 2012-224310

(51) Int. Cl.
*G09G 5/00* (2006.01)
*G09G 5/34* (2006.01)
*G06F 3/14* (2006.01)
*G06F 3/0346* (2013.01)
*G06F 3/0487* (2013.01)
*G06F 1/16* (2006.01)
*G06F 3/0485* (2013.01)

(52) U.S. Cl.
CPC ................. *G09G 5/34* (2013.01); *G06F 1/16* (2013.01); *G06F 3/0346* (2013.01); *G06F 3/0485* (2013.01); *G06F 3/0487* (2013.01); *G06F 3/1454* (2013.01)

(58) Field of Classification Search
CPC ..................................... G06F 3/0485
See application file for complete search history.

(56) References Cited

U.S. PATENT DOCUMENTS 6,466,198 B1 * 10/2002 Feinstein ....................... 345/158
7,607,111 B2 * 10/2009 Vaananen ............. G06F 1/1626
345/156
7,612,762 B2 * 11/2009 Andert et al. ................ 345/157
7,764,269 B2 * 7/2010 Sohn ..................... G06F 1/1616
345/156

(Continued)

FOREIGN PATENT DOCUMENTS

JP 2006-309617 11/2006
JP 2012-58847 3/2012

(Continued)

*Primary Examiner* — M Good Johnson
(74) *Attorney, Agent, or Firm* — Nixon & Vanderhye PC

(57) ABSTRACT

An example information processing apparatus determines whether an orientation of a display unit capable of being held by a user is in a first state or in a second state. If it has been determined that the orientation of the display unit is in the first state, the information processing apparatus sets, in a predetermined area, a display range to be displayed in the display unit, in accordance with the orientation of the display unit. If it has been determined that the orientation of the display unit is in the second state, the information processing apparatus sets the display range, regardless of the orientation of the display unit.

25 Claims, 8 Drawing Sheets

(56) References Cited

U.S. PATENT DOCUMENTS

| | | | |
|---|---|---|---|
| 7,859,516 B2* | 12/2010 | Hanyu | G06F 3/0485 |
| | | | 345/158 |
| 7,903,115 B2* | 3/2011 | Platzer et al. | 345/473 |
| 8,175,798 B2* | 5/2012 | Orr et al. | 701/400 |
| 8,682,277 B2* | 3/2014 | Luke et al. | 455/343.1 |
| 8,692,764 B2* | 4/2014 | Marvit et al. | 345/156 |
| 8,717,283 B1* | 5/2014 | Lundy et al. | 345/156 |
| 8,913,009 B2* | 12/2014 | Takeda et al. | 345/158 |
| 2007/0150810 A1* | 6/2007 | Katz et al. | 715/526 |
| 2008/0168384 A1* | 7/2008 | Platzer et al. | 715/784 |
| 2009/0153466 A1* | 6/2009 | Tilley | G06F 3/017 |
| | | | 345/156 |
| 2009/0262074 A1* | 10/2009 | Nasiri et al. | 345/158 |
| 2009/0303204 A1* | 12/2009 | Nasiri et al. | 345/184 |
| 2010/0134425 A1* | 6/2010 | Storrusten | 345/173 |
| 2010/0188432 A1* | 7/2010 | Tsai et al. | 345/684 |
| 2010/0300771 A1* | 12/2010 | Miyazaki | 178/18.03 |
| 2010/0325575 A1* | 12/2010 | Platzer et al. | 715/781 |
| 2011/0285704 A1 | 11/2011 | Takeda | |
| 2011/0291945 A1* | 12/2011 | Ewing et al. | 345/173 |
| 2012/0092342 A1 | 4/2012 | Suzuki et al. | |
| 2012/0223884 A1* | 9/2012 | Bi | G06F 1/1694 |
| | | | 345/158 |
| 2012/0306903 A1* | 12/2012 | Griffin | 345/589 |
| 2013/0091462 A1* | 4/2013 | Gray et al. | 715/810 |
| 2013/0113993 A1* | 5/2013 | Dagit, III | G06F 3/017 |
| | | | 348/552 |

FOREIGN PATENT DOCUMENTS

| | | |
|---|---|---|
| JP | 2012-88782 | 5/2012 |
| JP | 2012-161604 | 8/2012 |

* cited by examiner

DISPLAY APPARATUS, STORAGE MEDIUM HAVING STORED IN INFORMATION PROCESSING PROGRAM, INFORMATION PROCESSING APPARATUS, INFORMATION PROCESSING SYSTEM, AND IMAGE DISPLAY METHOD

CROSS REFERENCE TO RELATED APPLICATION

The disclosure of Japanese Patent Application No. 2012-224310, filed on Oct. 9, 2012, is incorporated herein by reference.

FIELD

The technology relates to a display apparatus, an information processing apparatus, an information processing system, and an image display method that display an image by changing a display range in accordance with the orientation of an apparatus, and a storage medium having stored therein an information processing program that displays an image by changing a display range in accordance with the orientation of an apparatus.

BACKGROUND AND SUMMARY

Conventionally, there is a technique of displaying an image of a virtual space on a display apparatus. Further, a display range to be displayed on a display apparatus is changed by changing the orientation (tilt) of an apparatus held by a user.

In a conventional technique of changing a display range in accordance with the orientation of an apparatus, the operation of changing the display range may be troublesome or a burden to a user.

Therefore, the present application discloses an information processing apparatus and the like that are capable of improving the operability of the operation of changing a display range in accordance with the orientation of an apparatus.

(1)

An example of a portable display apparatus according to the present specification includes a display unit and an orientation sensor. The orientation sensor detects an orientation of the display unit. When a screen of the display unit is generally parallel to a vertical direction, an image displayed on the screen scrolls in accordance with the orientation of the display unit. When the screen of the display unit is horizontal and directed upward, the scroll is stopped and an image of a predetermined range is displayed.

On the basis of the above configuration (1), if a screen of a display unit is directed in the vertical direction, a user can scroll an image by performing an intuitive operation such as changing the orientation of the display unit. Further, the user can easily stop a scroll operation based on the orientation of the display unit by making the screen of the display unit horizontal so as to be directed upward. This makes it possible to facilitate the scroll operation, and therefore improve the operability.

(2)

An example of a storage medium according to the present specification has stored therein an information processing program to be executed by a computer of an information processing apparatus. The information processing program causes the computer to execute determining whether it is in a first state or in a second state, and setting a display range. That is, the computer determines whether an orientation of a display unit capable of being held by a user is in a first state or in a second state. Further, if it has been determined that the orientation of the display unit is in the first state, the computer sets, in a predetermined area, a display range to be displayed in the display unit, in accordance with the orientation of the display unit, and if it has been determined that the orientation of the display unit is in the second state, the computer sets the display range, regardless of the orientation of the display unit.

On the basis of the above configuration (2), with the orientation of a display being in a first state, a user can control a display range by performing an intuitive operation such as changing the orientation of the display unit. Further, with the display unit being in a second state, the user can easily stop the operation for the display range based on the orientation of the display unit. This can facilitate the operation for the display range, and therefore improve the operability. Further, the switching between the first state and the second state is performed on the basis of a change in the orientation of the display unit. This enables the user to perform the switching without performing another operation different from the operation based on the orientation of the display unit. This makes it possible to simplify the operation for the display range, and therefore improve the operability.

(3)

If the orientation of the display unit has changed from the first state to the second state, a reference range determined in advance may be set as the display range.

On the basis of the above configuration (3), in accordance with a change to the second state, a reference range is displayed on the display unit. This enables the user to easily return the display range to the position of the reference range (the position of the reference range) by bringing the orientation of the display unit into the second state. This makes it possible to improve the operability of the operation of moving the display range.

(4)

If the orientation of the display unit has changed from the second state to the first state, a range that is substantially the same as the reference range may be set as an initial display range.

On the basis of the above configuration (4), at an early time when the orientation of the display unit has entered the first state, a reference range is the display range. This enables the user to perform the operation for the subsequent display range on the basis of the orientation and the display range at the time when the first state has been entered. This makes it possible to improve the operability of the operation for the display range.

(5)

The information processing program may further cause the computer to execute, if the orientation of the display unit is in the first state, determining whether or not the orientation of the display unit is substantially stopped during a predetermined period. In this case, if it has been determined that the orientation of the display unit is substantially stopped during the predetermined period, a reference range determined in advance may be set as the display range.

On the basis of the above configuration (5), if the orientation of the display unit is substantially stopped during a predetermined period, a reference range is the display range. In the above case, it is possible to assume that the display unit is propped against another object, which makes it possible to determine that the user does not intend to move the display range. Thus, on the basis of the above configuration (5), if the user does not intend to move the display range, it is possible to display the reference range, and therefore display a more appropriate display range in line with the user's intention.

(6)

At least when a screen of the display unit is parallel to a vertical direction, it may be determined that the orientation of the display unit is in the first state, and at least when the screen of the display unit is parallel to a horizontal direction and directed vertically upward, it may be determined that the orientation of the display unit is in the second state.

On the basis of the above configuration (6), at least in the state where a screen stands vertically, it is determined that the orientation is in the first state. At least in the state where the screen lies so as to be directed upward, it is determined that the orientation is in the second state. This enables the user to set a display range control function to on and off by performing a natural operation such as standing or laying the display unit. This makes it possible to improve the operability of the operation for the display range.

(7)

In accordance with such a change in the orientation that the screen of the display unit rotates about the vertical direction in the first state, the display range may move in a left-right direction.

On the basis of the above configuration (7), the display range moves in a left-right direction in accordance with the screen of the display unit rotating about a vertical direction. This enables the user to move the display range by changing the orientation of the display unit in the left-right direction (with the screen of the display unit standing). Further, on the basis of the above configuration (6), the user can switch between the enabled and disabled states of the display range control function by changing the orientation of the display unit in an up-down direction. Thus, the combination of the above configurations (6) and (7) prevents a switching operation from being a hindrance to the operation of moving the display range, and also enables the user to operate the display unit with a natural sense of operation. This makes it possible to improve the operability of the operation for the display range.

(8)

The information processing program may further cause the computer to execute arranging objects, and performing processing based on an object. That is, the computer arranges a plurality of objects in the predetermined area in a predetermined direction such that the objects included in the display range are changed in accordance with movement of the display range in the left-right direction. Further, if an operation of specifying one of the objects displayed on the display unit has been performed, the computer performs processing based on the specified object.

On the basis of the above configuration (8), the movement of the display range in the left-right direction results in changing objects to be displayed on the display unit. Thus, on the basis of the above configurations (5) through (7), the user can switch between the enabled and disabled states of the display range control function by changing the orientation of the display unit in the up-down direction, and can also change objects to be displayed by changing the orientation of the display unit in the left-right direction. This makes it possible to improve the operability of the operation of moving the display range to change objects to be displayed.

(9)

The information processing program may further cause the computer to execute, if it has been determined that the orientation of the display unit is in the second state, causing at least some of a plurality of objects arranged in the predetermined area to move, and if it has been determined that the orientation of the display unit is in the first state, stopping movement of the at least some objects.

On the basis of the above configuration (9), in the second state where the display range is incapable of being moved on the basis of the orientation of the display unit, some objects move. In the first state where the display range is capable of being moved in accordance with the orientation of the display unit, these objects do not move. This makes it possible to present much information to the user in the second state, and also makes it easy to perform the operation for the display range in the first state.

(10)

Using a magnitude relationship between a value representing a direction of a screen of the display unit and a threshold, it may be determined whether the orientation is in the first state or in the second state. In this case, the threshold may be set to a value varied depending on the first state and the second state such that a range of the orientation where the first state is maintained in the first state and a range of the orientation where the second state is maintained in the second state partially overlap each other.

On the basis of the above configuration (10), thresholds different between both states are used such that two ranges overlap each other. This prevents the first state and the second state from switching frequently even if the direction of the screen of the display unit changes near the threshold. This makes it possible to reduce the possibility that the first state and the second state switch frequently. This makes it possible to improve the operability of a switching operation.

(11)

A casing including the display unit may further include an operation unit. In this case, the information processing program may further cause the computer to execute, under the condition that the orientation of the display unit is in the second state, performing information processing based on a predetermined input to the operation unit.

On the basis of the above configuration (11), under the condition that the orientation of the display unit is in the second state, a predetermined input to an operation unit is received. This makes it possible to reduce the possibility that information processing unintended by the user is performed as a result of the user inadvertently providing the predetermined input while moving the orientation of a terminal apparatus 2 in the first state.

(12)

The display range may be set such that, if it has been determined that the orientation of the display unit is in the first state, the display range changes in accordance with a change in the orientation of the display unit, and if it has been determined that the orientation of the display unit is in the second state, the display range does not change in accordance with a change in the orientation of the display unit.

On the basis of the above configuration (12), the user can easily move the display range by performing the operation of changing the orientation of the display unit in the first state. Further, with the display unit being in the second state, the user can easily fix the display range. This makes the operation for the display range easier, which makes it possible to improve the operability.

(13)

A casing including the display unit may further include an inertial sensor. In this case, the information processing program may further cause the computer to execute calculating the orientation of the display unit on the basis of an output of the inertial sensor.

On the basis of the above configuration (13), it is possible to easily calculate the orientation of the display unit using the output of an inertial sensor.

(14)

The display unit may be included in a terminal apparatus separate from, and capable of communicating with, the information processing apparatus.

On the basis of the above configuration (14), it is possible to improve the operability of the operation of controlling the display range of the display unit of a terminal apparatus separate from an information processing apparatus.

(15)

The information processing apparatus may be capable of being held by a user and may include the display unit.

On the basis of the above configuration (15), it is possible to improve the operability of the operation of controlling the display range of the display unit of an information processing apparatus capable of being held by the user (i.e., portable).

It should be noted that the present specification discloses examples of an information processing apparatus and an information processing system that include means equivalent to the means achieved by executing the information processing program according to the above configurations (2) through (15). The present specification also discloses an example of an image display method performed by the above configurations (1) through (15).

The display apparatus, the storage medium having stored therein the information processing program, the information processing apparatus, the information processing system, and the image display method make it possible to switch between the enabled and disabled states of the function of controlling a display range, in accordance with the orientation of a display unit, thereby facilitating the operation for the display range.

These and other objects, features, aspects and advantages of the exemplary embodiment will become more apparent from the following detailed description of the exemplary embodiments when taken in conjunction with the accompanying drawings.

DETAILED DESCRIPTION OF NON-LIMITING EXAMPLE EMBODIMENTS

[1. Configuration of Information Processing System]

Figure 1:
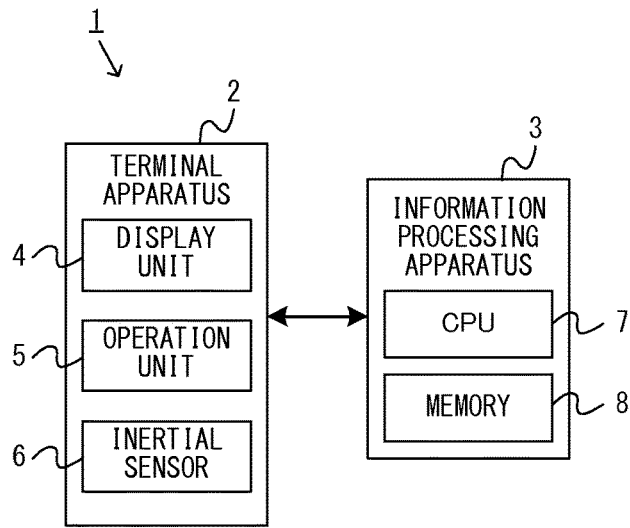
FIG. 1 is a block diagram showing a non-limiting example of an information processing system according to an exemplary embodiment.

A description is given below of an information processing system, an information processing apparatus, an information processing program, and an image display method according to an exemplary embodiment. FIG. 1 is a block diagram showing an example of the information processing system according to the exemplary embodiment. The information processing system 1 according to the exemplary embodiment controls a display range displayed on a screen of a terminal apparatus 2, in accordance with an operation performed using the terminal apparatus 2.

In FIG. 1, the information processing system 1 includes the terminal apparatus 2 and an information processing apparatus 3. The terminal apparatus 2 and the information processing apparatus 3 are capable of communicating with each other. The terminal apparatus 2 and the information processing apparatus 3 may communicate with each other using wireless communication or using wired communication. In the exemplary embodiment, the information processing apparatus 3 generates an image and transmits the generated image to the terminal apparatus 2, and the terminal apparatus 2 displays the image.

The terminal apparatus 2 includes a display unit 4. The terminal apparatus 2 has the function of displaying an image, and therefore can also be termed a display apparatus. In the exemplary embodiment, the terminal apparatus 2 is portable. In other words, the terminal apparatus 2 is an apparatus capable of being held by a user.

The display unit 4 displays an image of a predetermined area. The predetermined area may be any space (area). The predetermined area may be, for example, a three-dimensional virtual space or a two-dimensional plane. Further, an image of the predetermined area may be an image of the real world (real space) captured by a camera. Here, in the predetermined area, a range to be displayed on the display unit 4 is referred to as a "display range".

The terminal apparatus 2 includes an operation unit 5. The operation unit 5 is composed of one or more given operation devices. In the exemplary embodiment, the terminal apparatus 2 includes buttons (keys), sticks, and a touch panel as the operation unit 5. The terminal apparatus 2 transmits data representing an operation performed on the operation unit 5 as operation data to the information processing apparatus 3.

The terminal apparatus 2 includes an inertial sensor 6. The inertial sensor 6 is an example of a sensor (an orientation sensor) that outputs information enabling the calculation (the estimation) of the orientation of the terminal apparatus 2. Specifically, the inertial sensor 6 is a gyro sensor and/or an acceleration sensor. The inertial sensor 6 outputs information regarding the orientation of the terminal apparatus 2 with respect to a predetermined axial direction (which is three axial directions in the exemplary embodiment, but may only need to be one or more axial directions). In the exemplary embodiment, the terminal apparatus 2 transmits data detected by the inertial sensor 6 as operation data to the information processing apparatus 3. The information processing apparatus 3 calculates (estimates) the orientation of the terminal apparatus 2 on the basis of the data detected by the inertial sensor 6.

It should be noted that the method of calculating the orientation of the terminal apparatus 2 may be any method. For example, in another embodiment, the information processing system 1 may calculate the orientation of the terminal apparatus 2 on the basis of an image captured by a camera capable of photographing the terminal apparatus 2, or by a camera provided in the terminal apparatus 2.

In another embodiment, the terminal apparatus 2 may not include the operation unit 5 and/or the inertial sensor 6. Further, the terminal apparatus 2 may include another component in addition to the above components 4 through 6. For example, in another embodiment, the terminal apparatus 2 may have the function of communicating with an apparatus other than the information processing apparatus 3, and/or the function of connecting to a network such as the Internet.

The information processing apparatus 3 generates an image to be displayed on the display unit 4. In the exemplary embodiment, the information processing apparatus 3 receives, from the terminal apparatus 2, operation data including data from the operation unit 5 and the inertial sensor 6. Then, the information processing apparatus 3 generates an image of the predetermined area on the basis of the operation data. Further, the information processing apparatus 3 transmits the generated image to the terminal apparatus 2. The terminal apparatus 2 receives the image transmitted from the information processing apparatus 3, and causes the received image to be displayed on the display unit 4.

Figure 11:
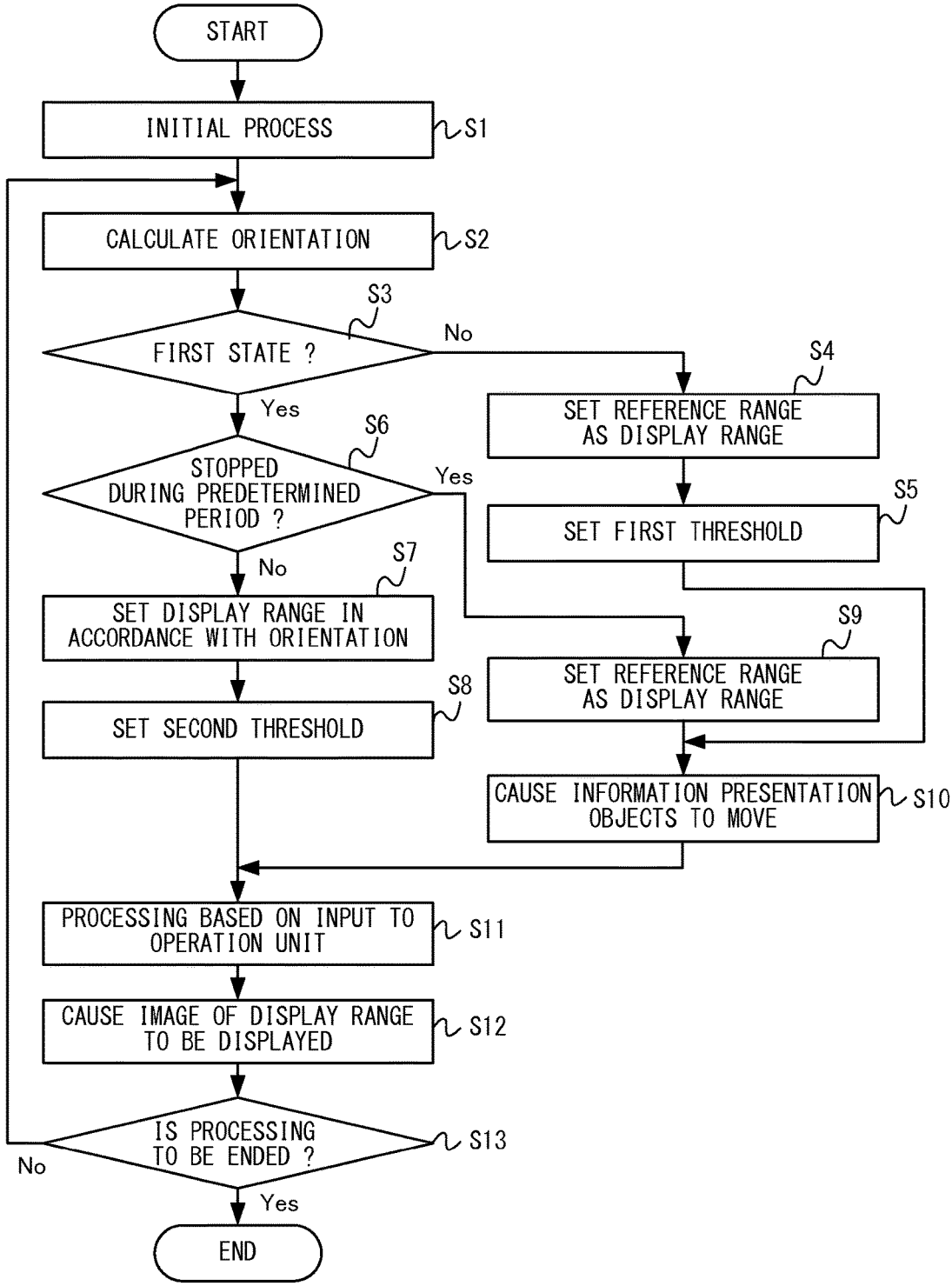
FIG. 11 is a flow chart showing a non-limiting example of the flow of the information processing performed by a CPU of the information processing apparatus in the exemplary embodiment.

In the exemplary embodiment, the information processing apparatus 3 has a CPU (control unit) 7 and a memory 8, so that the CPU 7 executes a predetermined information processing program using the memory 8, thereby achieving various functions of the information processing apparatus 3 (information processing shown in FIG. 11). It should be noted that the information processing apparatus 3 may be configured in any manner to perform the process of generating an image on the basis of operation data from the terminal apparatus 2, and transmitting the generated image.

As described above, in the exemplary embodiment, the information processing system 1 includes the information processing apparatus 3 and the terminal apparatus 2 separate from the information processing apparatus 3. It should be noted that, in another embodiment, the information processing system 1 may be composed of one apparatus. That is, the information processing system 1 may be one information processing apparatus having the function of generating an image and the function of displaying the image. In this case, the information processing apparatus is capable of being held by a user, and includes a display unit. For example, the information processing system 1 may be a mobile terminal such as a mobile phone, a smartphone, or a handheld game apparatus.

[2. Process of Setting Display Range According to Exemplary Embodiment]

In the exemplary embodiment, the information processing system 1 has the function of changing the display range of the display unit 4 in accordance with a change in the orientation of the terminal apparatus 2 (a display range control function). Further, in the exemplary embodiment, the switching of the state of the orientation of the terminal apparatus 2 results in switching between the enabled and disabled states (the on and off states) of the display range control function. A description is given below of the method of setting the display range according to the exemplary embodiment.

(2-1) Display Range Control Function Based on Orientation of Terminal Apparatus 2

Figure 2:
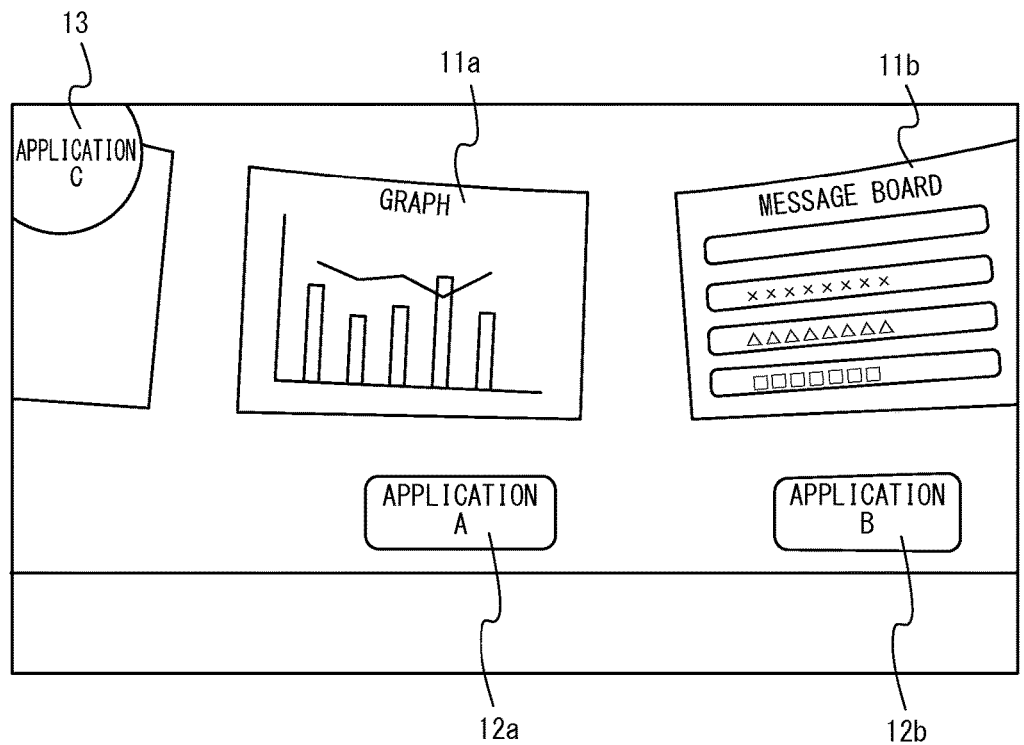
FIG. 2 is a diagram showing a non-limiting example of an image displayed on a display unit of a terminal apparatus.

FIG. 2 is a diagram showing an example of an image displayed on the display unit 4 of the terminal apparatus 2. In the exemplary embodiment, descriptions are given taking as an example the case where a virtual space representing a menu screen is constructed as the predetermined area, and a menu screen as shown in FIG. 2 is displayed on the display unit 4 (the details of the virtual space will be described later). In the virtual space representing the menu screen, an area in the display range is displayed on the display unit 4, and the display range moves (scrolls) in accordance with the orientation of the terminal apparatus 2. It should be noted that a plurality of objects (objects 11a, 11b, 12a, and 12b and the like shown in FIG. 2) are arranged in the predetermined area (the virtual space). If one of the objects is selected, the information processing associated with the selected object is performed.

Figure 3:
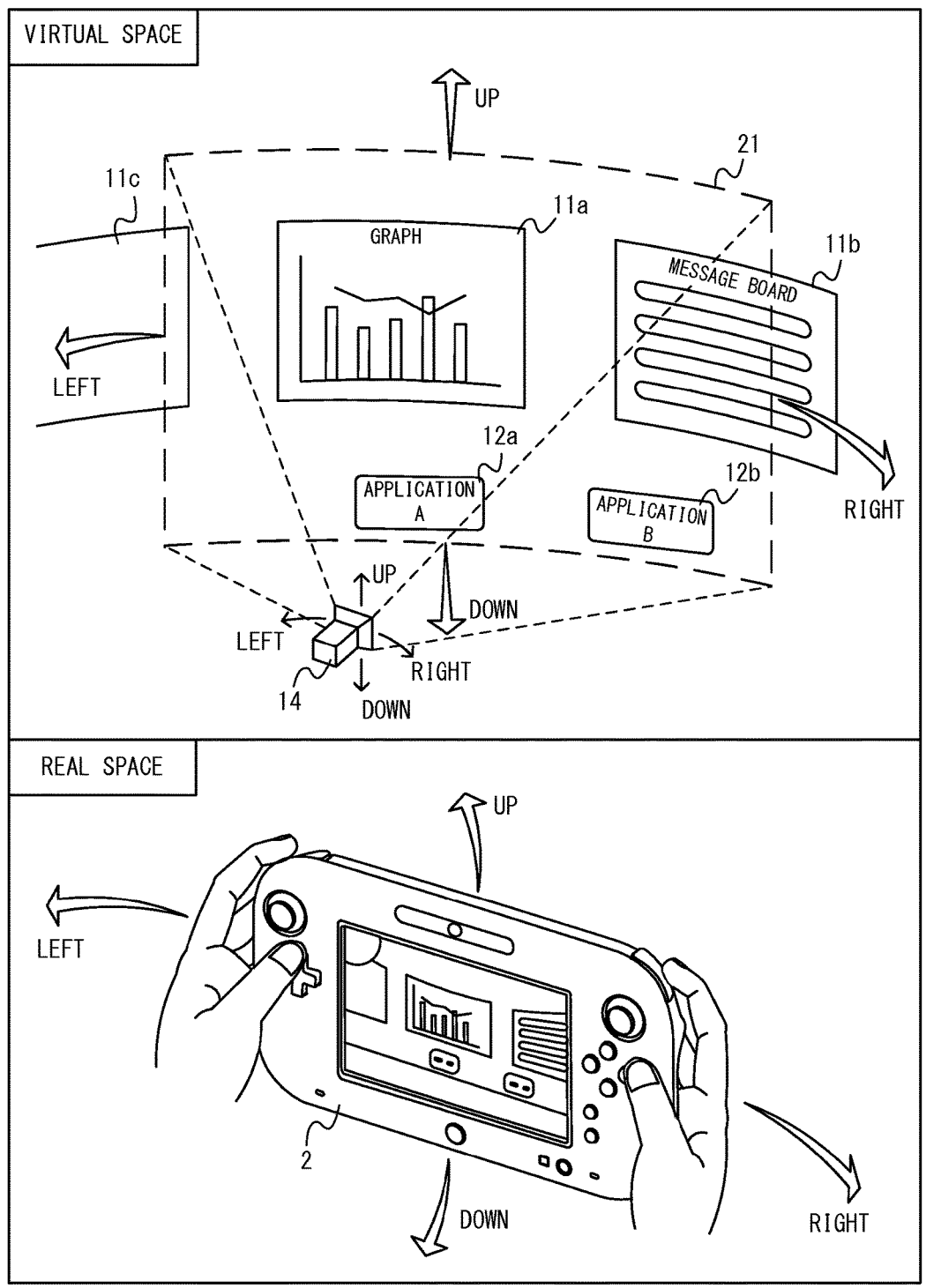
FIG. 3 is a diagram showing a non-limiting example of the relationship between the orientation of the terminal apparatus and a display range.

In the exemplary embodiment, the information processing system 1 can move the display range in accordance with a change in the orientation of the terminal apparatus 2. FIG. 3 is a diagram showing an example of the relationship between the orientation of the terminal apparatus 2 and the display range. As shown in FIG. 3, in the exemplary embodiment, a virtual camera 14 is set in the virtual space, and the range of field of view of the virtual camera 14 is a display range 21. The information processing system 1 calculates the orientation (the direction of the line of sight) of the virtual camera 14 on the basis of the orientation of the terminal apparatus 2. For example, the orientation of the virtual camera 14 in the virtual space is calculated so as to correspond to the orientation of the terminal apparatus 2 in real space. Specifically, in accordance with a change in the orientation of the terminal apparatus 2 from a certain state to the state of being directed in any one of the up, down, left, and right directions, the orientation of the virtual camera 14 is changed in (a direction, in the virtual space, corresponding to) the direction in which the orientation of the terminal apparatus 2 has changed (see arrows shown in FIG. 3). This causes the display range 21 to move upward, downward, leftward, and rightward as shown in FIG. 3. It should be noted that, in another embodiment, the display range may be controlled not only by a method using a virtual camera, but also by any method by which the display range moves in accordance with a change in the orientation of the terminal apparatus 2.

As described above, on the basis of the exemplary embodiment, the display range moves (scrolls) in accordance with the orientation of the terminal apparatus 2. This enables a user to move the display range by performing an intuitive operation using the terminal apparatus 2. This makes it possible to improve the operability of the operation of moving the display range.

(2-2) Switching of Display Range Control Function

Next, the switching of the display range control function (the switching of the enabled and disabled states) is described. As described above, in the exemplary embodiment, the display range changes in accordance with the orientation of the terminal apparatus 2. If, however, the display range changes by always reflecting the orientation of the terminal apparatus 2, the operation for the display range may be troublesome or a burden to the user. For example, if the user wishes to fix (stop) the display range, it is troublesome for the user to maintain the terminal apparatus 2 at a constant orientation. In response, in the exemplary embodiment, the information processing system 1 enables the switching of the display range control function based on the orientation of the terminal apparatus 2. This makes it possible to make the operation of changing the display range easier. The details are described below.

Figure 4:
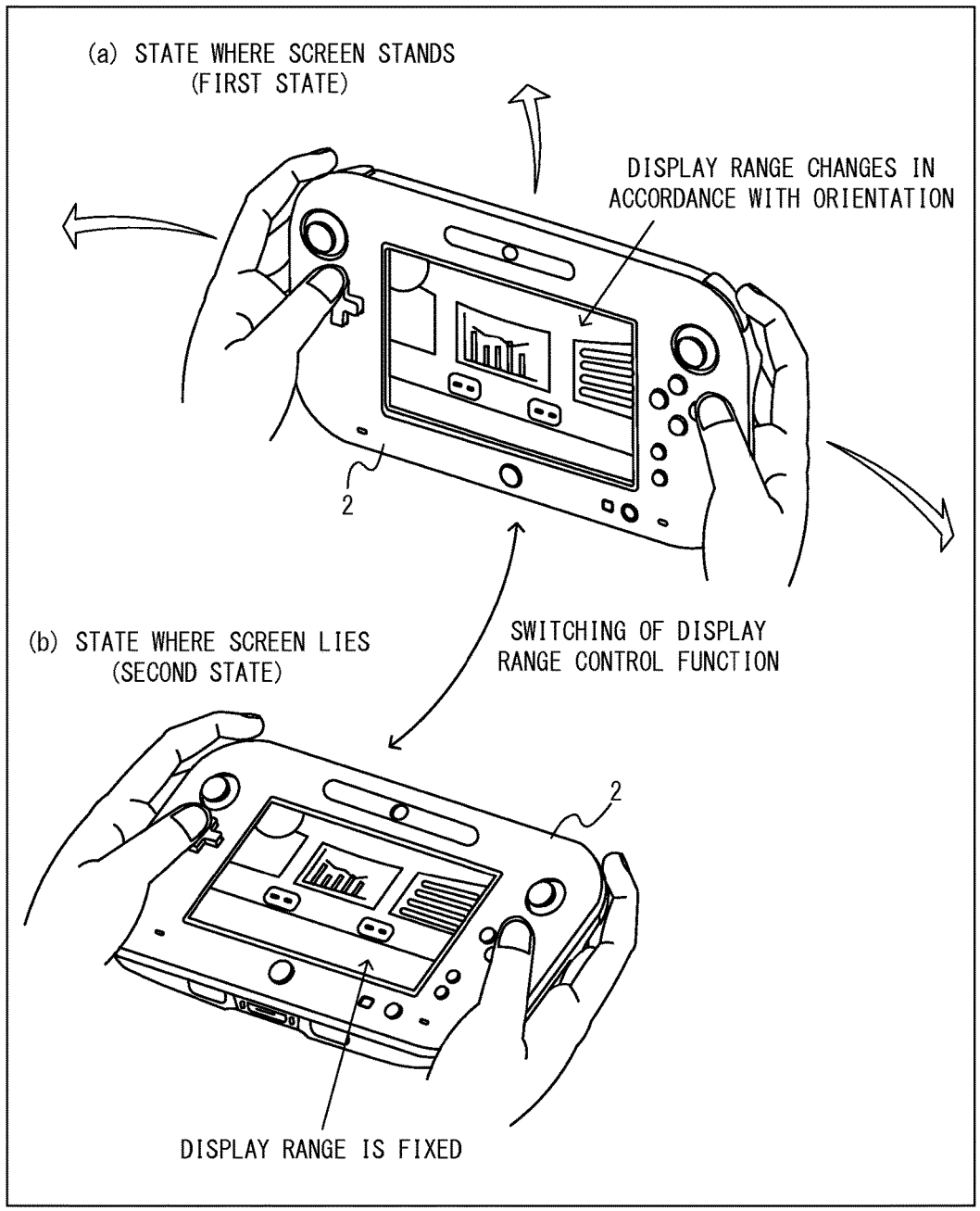
FIG. 4 is a diagram showing a non-limiting example of the method of switching a display range control function.

FIG. 4 is a diagram showing an example of the method of switching the display range control function. In the exemplary embodiment, the display range control function is enabled in the state where the screen of the display unit 4 of the terminal apparatus 2 stands (a state (a) shown in FIG. 4; hereinafter referred to as a "first state"). That is, in the first state, the display range changes in accordance with a change in the orientation of the terminal apparatus 2. Thus, the user holding the terminal apparatus 2 can move the display range by changing the orientation of the terminal apparatus 2 with the terminal apparatus 2 standing.

On the other hand, the display range control function is disabled in the state where the screen of the display unit 4 lies so as to be directed upward (a state (b) shown in FIG. 4; hereinafter referred to as a "second state"). That is, in the second state, even if the orientation of the terminal apparatus 2 has changed, the display range does not move. This enables the user to fix the display range by bringing the terminal apparatus 2 into the state where the screen lies so as to be directed upward.

It should be noted that, in the second state, the display range does not need to be incapable of moving. For example, the display range may move in accordance with another operation different from the operation based on the orientation of the terminal apparatus 2 (for example, an operation on a directional pad of the terminal apparatus 2).

Specifically, the information processing system 1 determines whether the orientation of the display unit 4 (the terminal apparatus 2) capable of being held by the user is in the first state (the state of standing) or in the second state (the state of lying so as to be directed upward). Then, if it has been determined that the orientation of the display unit 4 is in the first state, the information processing system 1 sets the display range by changing it in accordance with a change in the orientation of the display unit 4. If, on the other hand, it has been determined that the orientation of the display unit 4 is in the second state, the information processing system 1 sets the display range so as not to change in accordance with a change in the orientation of the display unit 4.

On the basis of the above, with the terminal apparatus 2 being in the first state, the user can move the display range by performing an intuitive operation such as changing the orientation of the terminal apparatus 2. Further, with the terminal apparatus 2 being in the second state, the user can easily fix the display range. This can facilitate the operation for the display range, which makes it possible to improve the operability. Further, the switching between the first state and the second state is performed in accordance with a change in the orientation of the terminal apparatus 2. This enables the user to perform the switching without performing another operation different from the operation based on the orientation of the terminal apparatus 2. This makes it possible to simplify the operation for the display range, and therefore improve the operability.

(2-3) Orientation Determination

Figure 5:
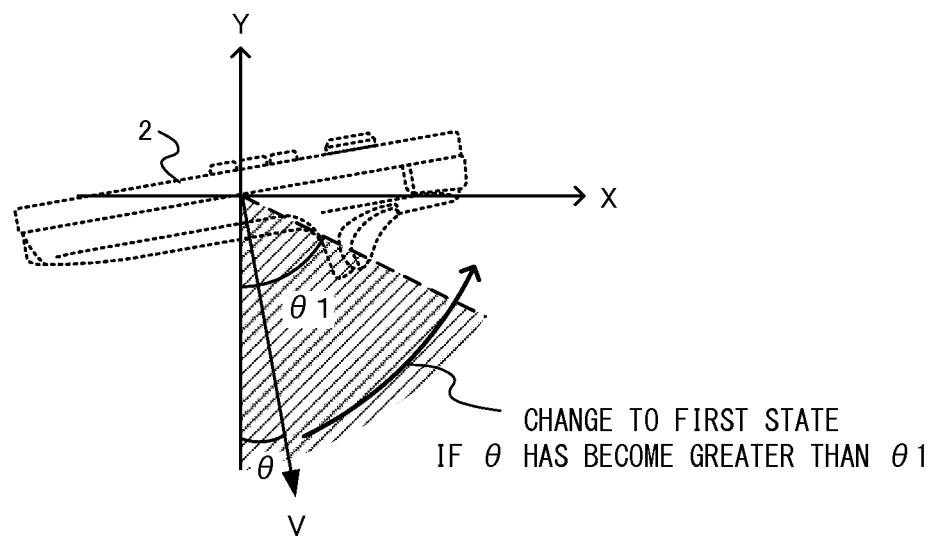
FIG. 5 is a diagram showing a non-limiting example of the relationship between the orientation of the terminal apparatus in the second state and a threshold.
Figure 6:
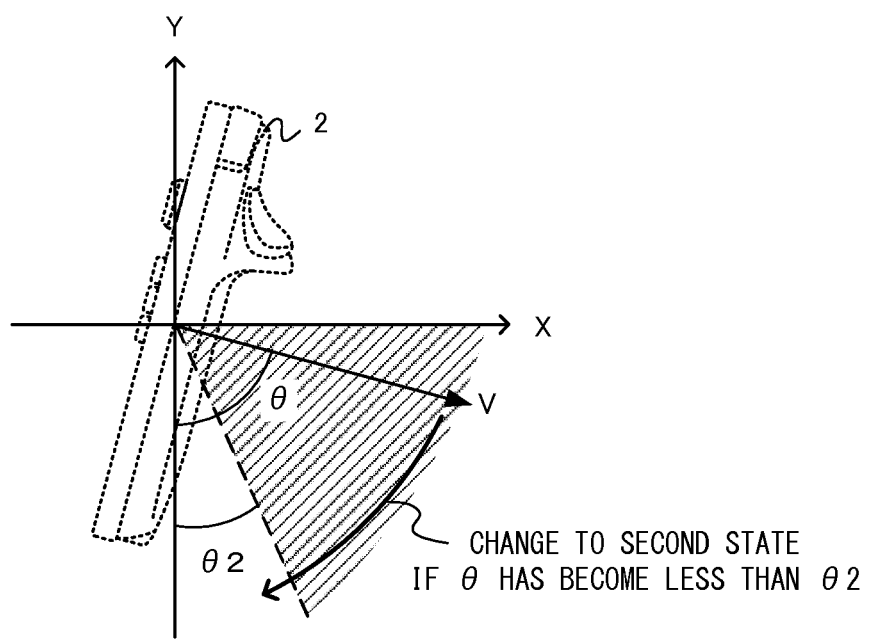
FIG. 6 is a diagram showing a non-limiting example of the relationship between the orientation of the terminal apparatus in the first state and the threshold.

With reference to FIGS. 5 and 6, a description is given of the method of determining the state of the orientation of the terminal apparatus 2 (the display unit 4). As described above, in the exemplary embodiment, the first state is the state where the screen of the display unit 4 stands, and the second state is the state where the screen lies so as to be directed upward. That is, at least when the screen of the display unit 4 is parallel to the vertical direction, the information processing system 1 determines that the orientation of the terminal apparatus 2 is in the first state. At least when the screen of the display unit is parallel to the horizontal direction and directed vertically upward, the information processing system 1 determines that the orientation of the terminal apparatus 2 is in the second state. Thus, in the exemplary embodiment, the user can set the display range control function to on and off by performing a natural operation such as standing or laying the plate-like terminal apparatus 2 (see FIG. 4). This makes it possible to improve the operability of the operation for the display range.

In the exemplary embodiment, the determination of whether the orientation of the terminal apparatus 2 is in the first state or in the second state (an orientation determination) is made on the basis of the magnitude relationship between a value representing the direction of the screen (specifically, the angle of the screen) of the display unit 4 and a threshold. Here, the exemplary embodiment uses thresholds having values different between the case of the first state and the case of the second state (the threshold changes). With reference to FIGS. 5 and 6, the details of the orientation determination are described below.

FIG. 5 is a diagram showing an example of the relationship between the orientation of the terminal apparatus 2 in the second state and the threshold. In the exemplary embodiment, a vector V shown in FIG. 5 is used as information representing the orientation of the terminal apparatus 2. The vector V is a vector perpendicular to the screen of the display unit 4 and directed from the closer side to the further side in the depth direction of the screen. It should be noted that, in the exemplary embodiment, the information processing system 1 calculates the vector V on the basis of the output of the inertial sensor 6. Alternatively, in another embodiment, the orientation of the terminal apparatus 2 (the vector V) may be calculated by any method.

In the second state, the orientation determination is made using a first threshold $\theta 1$ shown in FIG. 5. That is, in the second state, if an angle $\theta$ of the vector V relative to the vertically downward direction has become greater than the first threshold $\theta 1$, the information processing system 1 determines that the orientation of the terminal apparatus 2 is in the first state (makes a transition to the first state) (see FIG. 5). If, on the other hand, the angle $\theta$ is equal to or less than the first threshold $\theta 1$, the information processing system 1 determines that the orientation of the terminal apparatus 2 is in the second state (maintains the second state).

FIG. 6 is a diagram showing an example of the relationship between the orientation of the terminal apparatus 2 in the first state and the threshold. In the first state, the orientation determination is made using a second threshold $\theta 2$ shown in FIG. 6. That is, in the first state, if the angle $\theta$ of the vector V relative to the vertically downward direction has become less than the second threshold $\theta 2$, the information processing system 1 determines that the orientation of the terminal apparatus 2 is in the second state (makes a transition to the second state) (see FIG. 6). If, on the other hand, the angle $\theta$ is equal to or greater than the second threshold $\theta 2$, the information processing system 1 determines that the orientation of the terminal apparatus 2 is in the first state (maintains the first state). Thus, in the exemplary embodiment, the display range moves in accordance with a change in the orientation of the terminal apparatus 2 in the range where the angle $\theta$ is equal to or greater than the second threshold $\theta 2$. Further, in the exemplary embodiment, if the angle $\theta$ is equal to or greater than 90° (that is, if the screen is directed downward), it is determined that the orientation of the terminal apparatus 2 is in the first state. That is, the second state according to the exemplary embodiment is the state where the orientation of the terminal apparatus 2 is such that the screen of the display unit 4 is close to horizontal and directed upward.

Here, as shown in FIGS. 5 and 6, the value of the first threshold $\theta 1$ is set to be greater than that of the second threshold $\theta 2$. Consequently, the thresholds $\theta 1$ and $\theta 2$ are set such that the range where the first state is maintained in the first state (a shaded range shown in FIG. 6) and the range where the second state is maintained in the second state (a shaded range shown in FIG. 5) partially overlap each other. Thresholds different between both states may be thus used such that the above two ranges overlap each other, which makes it possible to reduce the possibility that the first state and the second state switch frequently. That is, even if the angle $\theta$ changes near the threshold, it is possible to reduce the possibility that the first state and the second state switch frequently, and therefore improve the operability of the switching operation. It should be noted that the first threshold $\theta 1$ may be set in the range of, for example, $60°\leq\theta 1\leq 80°$, and the second threshold $\theta 2$ may be set in the range of, for example, $10°\leq\theta 2\leq 30°$.

As described above, in the exemplary embodiment, in the second state, if the direction of the screen of the display unit 4 (the direction opposite to the direction of the vector V) has come close to a predetermined direction (the horizontal direction) across the threshold, the information processing system 1 determines that the orientation of the display unit 4 is in the first state. Further, in the first state, if the direction of the screen has moved away from the predetermined direction across the threshold, the information processing system 1 determines that the orientation of the display unit 4 is in the second state. Then, each threshold is set such that the direction represented by the threshold in the second state is closer to the predetermined direction than the direction represented by the threshold in the first state is.

It should be noted that, in another embodiment, the orientation determination may be performed by any method. For example, in another embodiment, the same threshold may be used in the first state and the second state.

In addition, in the exemplary embodiment, the second state is the state where the screen is close to horizontal (and directed upward), and the first state is the state where the screen is not close to horizontal. The two states, however, used to switch between the enabled and disabled states of the display range control function may be set in any manner. For example, in another embodiment, the first state may be the state where the orientation of the terminal apparatus 2 is such that the shorter sides of the terminal apparatus 2 are placed left and right (the orientation is such that the screen is horizontally long), and the second state may be the state where the orientation of the terminal apparatus 2 is such that the shorter sides of the terminal apparatus 2 are placed up and down (the orientation is such that the screen is vertically long). This enables the user to switch between the enabled and disabled states of the display range control function by performing the operation of placing the shorter sides of the screen left and right or up and down. Further, for example, in another embodiment, the first state may be the state where the terminal apparatus 2 has rotated about the up-down direction of the screen by equal to or greater than 180° from a predetermined reference state, and the second state may be the state where the amount of rotation of the terminal apparatus 2 is less than 180° from the predetermined reference state. This enables the user to switch between the enabled and disabled states of the display range control function by performing the operation of directing the screen to the user themselves or another person.

(2-4) Display Range in Second State

Figure 7:
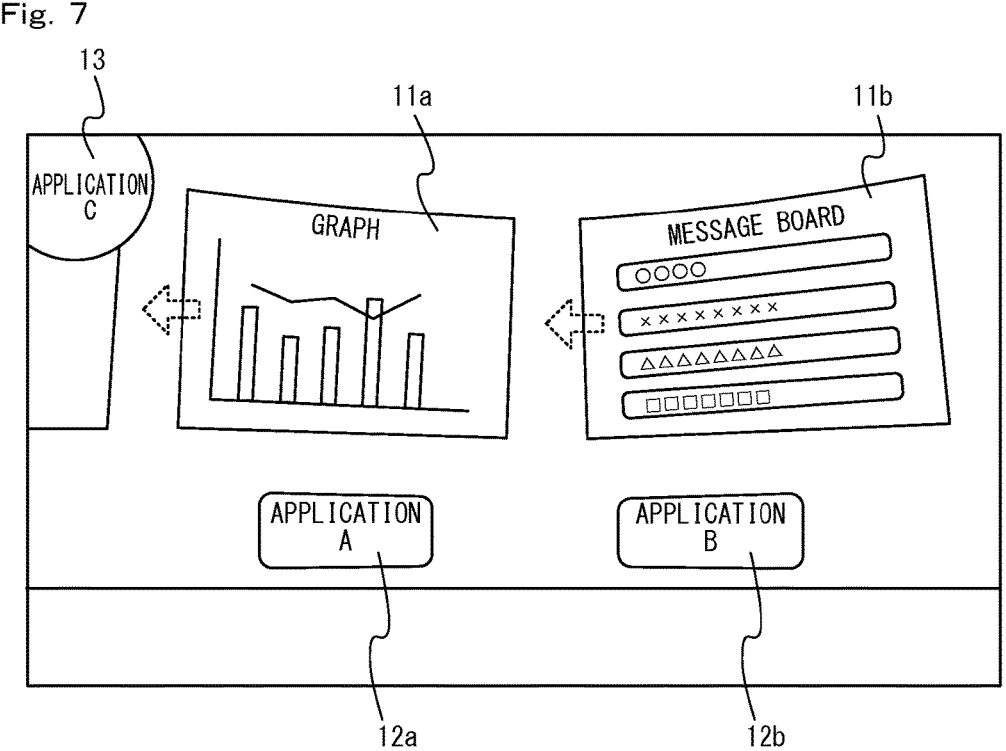
FIG. 7 is a diagram showing a non-limiting example of an image displayed on a display unit in the second state.

Next, a description is given of the display range when the orientation of the terminal apparatus 2 is in the second state. As described above, the display range in the second state does not change in accordance with the orientation of the terminal apparatus 2 and is fixed (or may be moved by another method). Here, in the exemplary embodiment, if the orientation of the terminal apparatus 2 has changed from the first state to the second state, the information processing system 1 sets a reference range determined in advance as the display range. FIG. 7 is a diagram showing an example of an image displayed on the display unit 4 in the second state. In the exemplary embodiment, the display range shown in FIG. 7 is the reference range.

As described above, if the display range is the reference range in the second state, the user can easily return the display range to the position of the reference range by bringing the orientation of the terminal apparatus 2 into the second state (laying the screen). Such facilitation of the operation of returning the display range to the position of the reference range makes it possible to improve the operability of the operation of moving the display range.

It should be noted that the reference range may be set in any manner, and for example, may be set such that frequently used objects (objects selected many times) are displayed. For example, if objects that are assumed to be frequently used are known in advance, the reference range may be set such that these objects are displayed near the center of the screen. It should be noted that, in another embodiment, the information processing system 1 may change the arrangement of objects and/or the position of the reference range at appropriate timing such that frequently used objects are included in the reference range. If frequently used objects are included in the reference range, the chances are increased that the user can select a desired object with the second state maintained, without bringing the orientation of the terminal apparatus 2 into the first state and moving it. This makes it possible to improve the operability of the operation of selecting an object.

(2-5) Display Range in First State

Next, a description is given of the display range when the orientation of the terminal apparatus 2 is in the first state. As described above, in the first state, the display range changes in accordance with a change in the orientation of the terminal apparatus 2.

(Display Range when Change has been Made from Second State to First State)

If the orientation of the terminal apparatus 2 has changed from the second state to the first state, the information processing system 1 sets the reference range as an initial display range. Thus, if the user has brought the orientation of the terminal apparatus 2 into the first state to perform the operation for the display range, a certain display range (the reference range) is always displayed first, regardless of the orientation of the terminal apparatus 2 when the first state has been entered. This enables the user to, on the basis of the orientation and the display range when the first state has been entered, perform the subsequent operation for the display range. This makes it possible to improve the operability of the operation for the display range. For example, if wishing to display the reference range while performing the operation of moving the display range, the user can reset the display range (return the display range to the reference range) by once bringing the orientation of the terminal apparatus 2 into the second state and then bringing it into the first state again.

It should be noted that the initial display range when a change has been made from the second state to the first state does not need to be exactly the same as the reference range. Even a range that is substantially the same as the reference range can improve the operability of the operation for the display range. That is, when a change is made from the second state to the first state, the information processing system 1 may move the display range.

Figure 8:
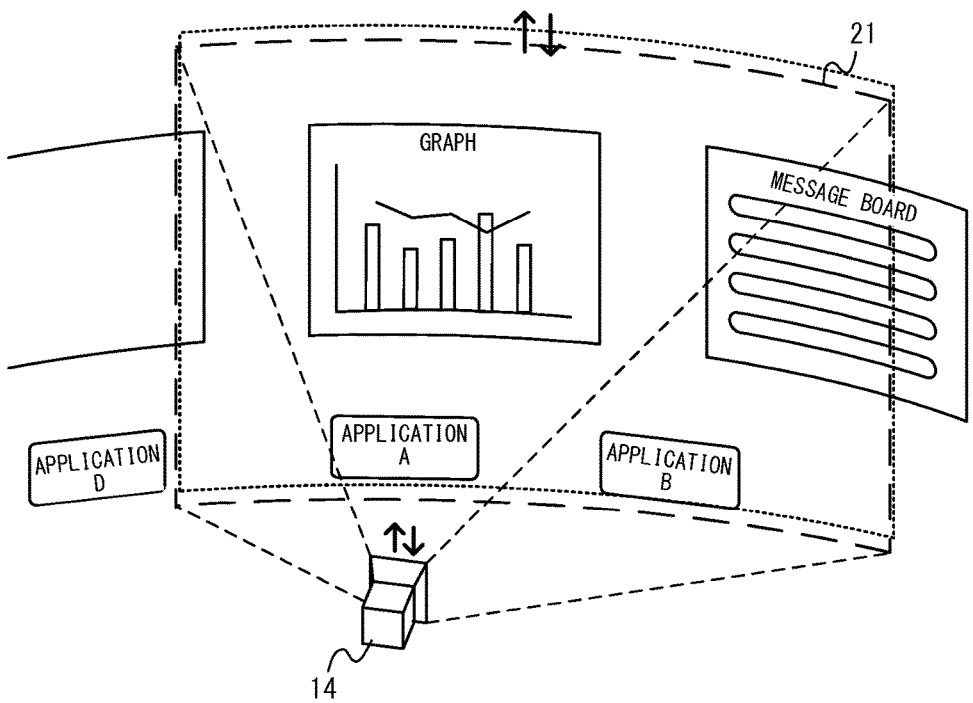
FIG. 8 is a diagram showing a non-limiting example of the operation of moving the display range.

FIG. 8 is a diagram showing an example of the operation of moving the display range. As shown in FIG. 8, when a change has been made from the second state to the first state, the information processing system 1 may temporarily move the display range (reference range) 21 in a predetermined direction (the up direction in FIG. 8), and then return it to the original position (the position of the reference range). This enables the user to clearly recognize that a change has been made from the second state to the first state. Further, the information processing system 1 may set as the initial display range a range (that is substantially the same as the reference range and) shifted slightly from the reference range. This also results in slightly moving the display range when a change has been made from the second state to the first state, which enables the user to clearly recognize that a change has been made from the second state to the first state.

(Setting of Display Range Based on Orientation)

In the first state, the information processing system 1 sets the display range on the basis of the orientation of the terminal apparatus 2 and the reference range. That is, the direction in which the display range changes from the reference range is determined in accordance with the direction in which the orientation of the terminal apparatus 2 changes from a reference orientation. Further, the amount of change in the display range from the reference range is determined in accordance with the amount of change in the orientation of the terminal apparatus 2 from the reference orientation. It should be noted that the reference orientation is the orientation when a change has been made from the second state to the first state.

It should be noted that, in the exemplary embodiment, the information processing system 1 changes the display range by changing the orientation of the virtual camera 14 in accordance with a change in the orientation of the terminal apparatus 2 (from the reference orientation). It should be noted that limits may or may not be set on the range in which the orientation of the virtual camera 14 is allowed. If such limits are set, the information processing system 1 may change the orientation of the virtual camera 14, for example, in the range of 180° in the left-right direction symmetrically with respect to the orientation of the virtual camera 14 corresponding to the reference range.

In addition, in the exemplary embodiment, in the first state, the display range moves in a direction corresponding to the direction of a change in the orientation of the terminal apparatus 2 (see FIG. 3). For example, in accordance with such a change in the orientation of the terminal apparatus 2 that the screen of the display unit 4 rotates about the vertical direction (a change in the orientation of the terminal apparatus 2 in the left-right direction), the display range moves in the left-right direction. Thus, in the exemplary embodiment, the user can switch between the enabled and disabled states of the display range control function by changing the orientation of the terminal apparatus 2 in the up-down direction, and can also move the display range by changing the orientation of the terminal apparatus 2 in the left-right direction. This prevents the switching operation from being a hindrance to the operation of moving the display range, and also enables the user to operate the terminal apparatus 2 with a natural sense of operation. This makes it possible to improve the operability of the terminal apparatus 2.

In addition, although not shown in FIG. 3, the display range changes also in accordance with a change in the orientation of the terminal apparatus 2 in the roll direction (the direction of rotation about a line perpendicular to the screen), similarly to another direction. That is, the information processing system 1 changes the orientation of the virtual camera 14 in the roll direction (the direction of rotation about the direction of the line of sight) in accordance with a change in the orientation of the terminal apparatus 2 in the roll direction. It should be noted that the information processing system 1 controls the orientation of the virtual camera 14 such that, in the roll directions, the direction of a change in the orientation of the terminal apparatus 2 and the direction of a change in the orientation of the virtual camera 14 are the same as each other. This makes it possible to set the display range such that the rotation of the terminal apparatus 2 in the roll direction does not change the direction of the predetermined area as viewed from the user.

(Processing when Orientation is Substantially Stopped)

Here, the terminal apparatus 2 may be used while propped against a dedicated stand (for example, a charging apparatus) or another object. In this case, the user is not holding the terminal apparatus 2, and therefore, it is considered that the user does not intend to control the movement of the display range on the basis of the orientation of the terminal apparatus 2. Thus, in the exemplary embodiment, the information processing system 1 determines whether or not the terminal apparatus 2 (the display unit 4) is in the first state and is also stopped (a stoppage determination). Then, if the terminal apparatus 2 is in the first state and is also placed on another object, the reference range is set as the display range. This makes it possible to display the reference range if the user does not intend to move the display range, which makes it possible to display a more appropriate display range in line with the user's intention.

It should be noted that the stoppage determination is made on the basis of, for example, whether or not, when the orientation of the terminal apparatus 2 is in the first state, the orientation is substantially stopped during a predetermined period. More specifically, the stoppage determination may be made on the basis of whether or not a change in the orientation of the terminal apparatus 2 calculated on the basis of the output of the inertial sensor 6 is equal to or less than a predetermined value during the predetermined period.

(2-6) Arrangement of Objects in Predetermined Area

A description is given below of the details of the predetermined area to be displayed. In the exemplary embodiment, the virtual space representing the menu screen is constructed as the predetermined area. As shown in FIGS. 2 and 7, the plurality of objects (the objects 11*a*, 11*b*, 12*a*, and 12*b* and the like) are arranged in the predetermined area (the virtual space).

In the exemplary embodiment, information presentation objects (the objects 11*a* and 11 and the like) and application objects (the objects 12*a* and 12*b*) are arranged as the above objects.

The information presentation objects are objects having the function of presenting some information. For example, the object 11*a* represents a graph of the results of statistics of a predetermined application. Further, the object 11*b* represents a message board on which information to be notified to the user is written. Thus, the display of the information presentation objects on the display unit 4 enables the user to obtain information without selecting the information presentation objects. Further, if one of the information presentation objects has been selected, for example, more detailed information may be displayed on the display unit 4 by performing the information processing associated with the selected object.

The application objects are objects representing the applications associated therewith. In the exemplary embodiment, the object 12*a* represents an application A, and the object 12*b* represents an application B. If one of the application objects has been selected, the application associated with the selected application object is executed (started).

It should be noted that the objects to be arranged in the predetermined area may be not only the information presentation objects or the application objects but also any objects. The objects may be capable of being selected (information processing may be performed in accordance with the selection of the objects), or may not be capable of being selected (may only be simply displayed).

Figure 9:
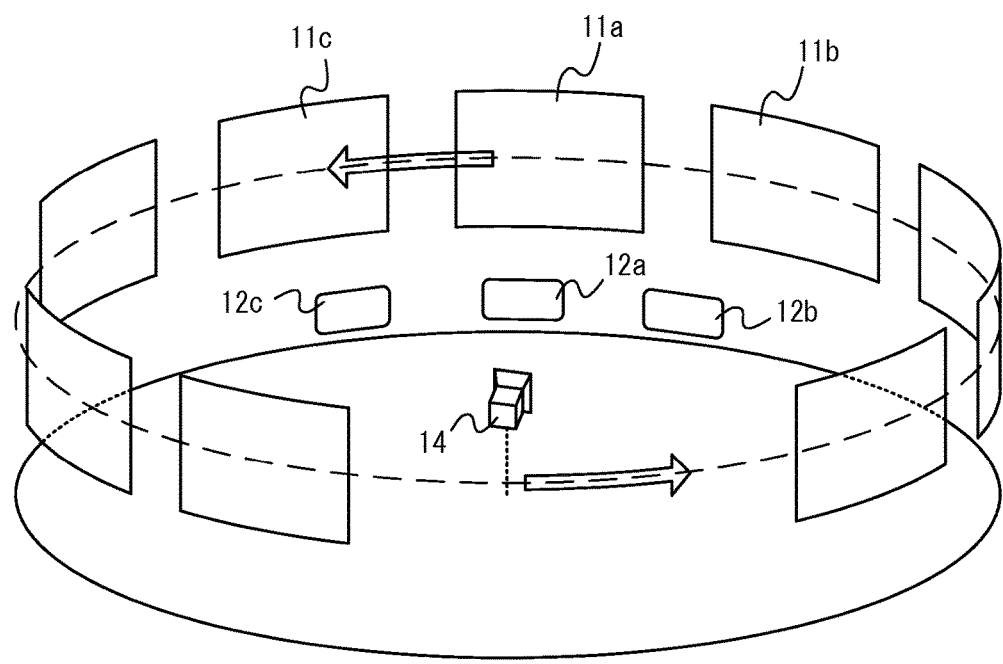
FIG. 9 is a diagram showing a non-limiting example of a virtual space, which is a predetermined area.

FIG. 9 is a diagram showing an example of the virtual space, which is the predetermined area. As shown in FIG. 9, in the exemplary embodiment, the plurality of information presentation objects (the objects 11*a* through 11*c* and the like) are annularly arranged around the virtual camera 14. Then, the display range moves on the basis of a change in the orientation of the virtual camera 14 in accordance with the orientation of the terminal apparatus 2 (see FIG. 3), and the objects displayed on the display unit 4 are changed. It should be noted that, in another embodiment, the predetermined area may be a plane, and the display range set on the plane may be set so as to move in accordance with the orientation of the terminal apparatus 2.

On the basis of the above, in the exemplary embodiment, when the display range moves in the left-right direction, the objects included in the display range are changed. The information processing system 1 arranges the plurality of objects so as to be aligned in a predetermined direction so that the objects included in the display range are changed in accordance with the movement of the display range in the left-right direction. Thus, in the exemplary embodiment, the user can switch between the enabled and disabled states of the display range control function by changing the orientation of the terminal apparatus 2 in the up-down direction, and can also change the objects to be displayed by changing the orientation of the terminal apparatus 2 in the left-right direction.

In addition, in the exemplary embodiment, when the orientation of the terminal apparatus 2 is in the second state, the information processing system 1 causes the information presentation objects to move in the predetermined area. Specifically, as shown in FIG. 9, each information presentation object moves along a circle around the virtual camera 14 (see arrows shown in FIG. 9). Thus, in the exemplary embodiment, in the second state where the reference range is displayed, the information presentation objects move on the screen when displayed (see arrows shown in FIG. 7). As described above, in the exemplary embodiment, in the second state, the display range is fixed to the reference range; however, each information presentation object moves, thereby sequentially changing the information presentation objects displayed on the display unit 4. This enables the user to view each information presentation object also in the second state. It should be noted that, in the exemplary embodiment, the application objects (the objects 12*a* through 12*c* and the like) do not move in the predetermined area.

When, on the other hand, the orientation of the terminal apparatus 2 is in the first state, the information processing system 1 stops the information presentation objects. This is because, in the first state, the user can display a desired information presentation object by performing an operation themselves to move the display range. Further, the stoppage of the information presentation objects makes it possible to make the operation of moving the display range easier to the user. It should be noted that, in another embodiment, the information processing system 1 may cause the information presentation objects to move also in the first state as in the second state.

As described above, in the exemplary embodiment, among the plurality of objects arranged in the predetermined area, first objects (the information presentation objects) are set so as to be capable of being moved, and second objects (the application objects) are set so as to be fixed. Further, some of the second objects are arranged in the reference range. In the second state, this makes it possible to present much information to the user by each first object that moves, and also makes it easy for the user to select the second objects fixedly displayed in the reference range. This makes it possible to improve the operability of the menu screen on which the plurality of objects are displayed. Further, in the exemplary embodiment, the first objects represent more information than the second objects (have a larger amount of information than that of the second objects). This makes it possible to present information more effectively to the user, using the objects.

It should be noted that, in accordance with the satisfaction of a predetermined condition, the information processing system 1 may change the positions of the information presentation objects such that particular information presentation objects among the information presentation objects are included in the display range. This makes it possible to present, to the user, information presentation objects having more appropriate contents. For example, if the menu screen is displayed after the execution of a predetermined application ends, the information presentation objects may be arranged such that information presentation objects representing information regarding the predetermined application are included in the display range (or the reference range). It should be noted that the information presentation objects representing information regarding the predetermined application may be, for example, objects representing information such as the usage, the results of usage, and the performance of the predetermined application.

In addition, in the exemplary embodiment, as shown in FIGS. 2 and 7, a fixed object 13 is displayed on the display unit 4. The fixed object 13 is an object displayed at a predetermined position on the screen independently of the position of the display range. In the exemplary embodiment, the fixed object 13 is an application object representing an application C. It should be noted that the fixed object 13 may be any type of object, and may be an information presentation object as described above or another type of object.

In addition, the information processing system 1 may not display the fixed object 13 in the first state, and may display the fixed object 13 (only) in the second state. This prevents the fixed object 13 from being a hindrance in the first state where the display range is capable of being moved, which makes the display range easier to view. This makes it possible to improve the operability of the operation for the display range.

(2-7) Input to Operation Unit

Next, a description is given of operations other than the operation of changing the orientation of the terminal apparatus 2. In the exemplary embodiment, the user can perform operations on the operation unit 5 of the terminal apparatus 2. Specifically, it is possible to perform, for example, the following operations (a) through (c).

(a) the operation of selecting an object on the screen using the touch panel
(b) the operation of inputting a direction to the screen using the touch panel
(c) the operation of moving the display range using the directional pad The information processing system 1 performs predetermined types of information processing in accordance with the above operations. The predetermined types of information processing may be, for example, the process of changing the display range, and the processing on an object in the predetermined area included in the display range. It should be noted that the processing on an object may be, for example, the process of causing the object to move, and the processing to be performed when the object has been selected (the processing associated with the object). Specifically, in accordance with the above operation (a), the information processing system 1 performs the processing associated with the selected object. Further, in accordance with the above operation (b), the information processing system 1 performs the process of causing the information presentation objects to move in the input direction. Further, in accordance with the above operation (c), the information processing system 1 moves the display range.

Here, under the condition that the orientation of the terminal apparatus 2 (the display unit 4) is in the second state, the information processing system 1 may perform the predetermined type of information processing based on a predetermined input to the operation unit. In the exemplary embodiment, the information processing based on an input provided by the above operation (c) is performed only when the orientation of the terminal apparatus 2 is in the second state. That is, the above operation (c) is received only when the orientation of the terminal apparatus 2 is in the second state. As described above, under the condition that the orientation of the terminal apparatus 2 (the display unit 4) is in the second state, the information processing system 1 receives a predetermined input to the operation unit. This makes it possible to reduce the possibility that information processing unintended by the user is performed as a result of the user inadvertently providing the predetermined input while moving the orientation of the terminal apparatus 2 in the first state.

In addition, in another embodiment, the information processing system 1 may receive a predetermined input to, for example, the touch panel (more specifically, an input for drawing a line, such as a character input and/or a gesture input) only in the second state. This makes it possible to, in the second state where it is easy to provide the predetermined input to the touch panel (the state where the screen is directed upward), provide the predetermined input, which makes it possible to facilitate an input to the touch panel.

[3. Example of Specific Processing Performed by Information Processing System]

(3-1) Data Used for Information Processing

Figure 10:
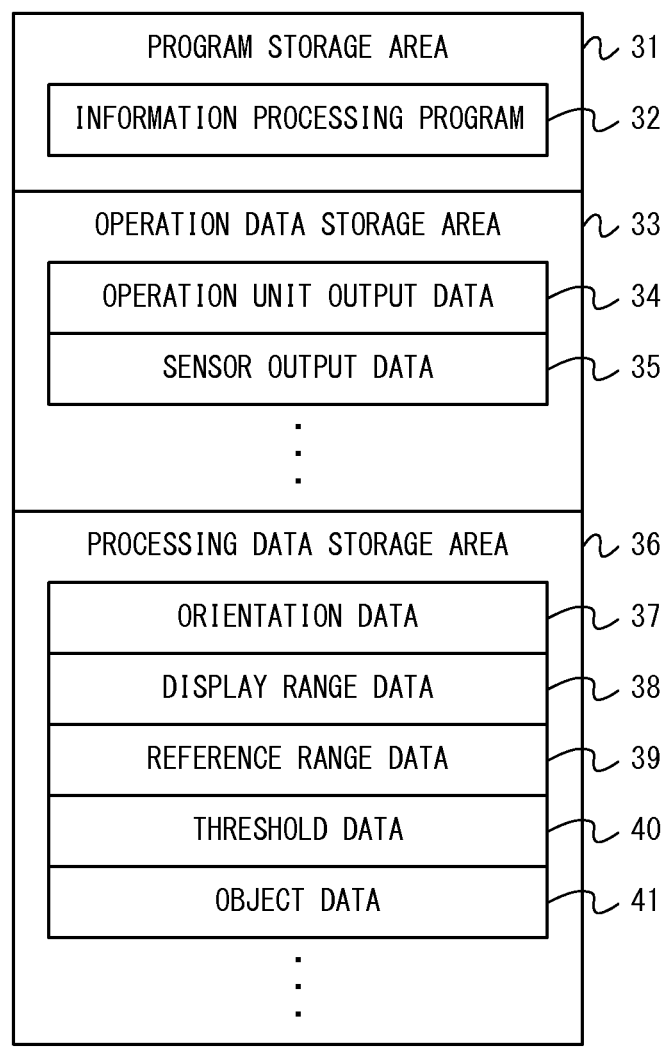
FIG. 10 is a diagram showing a non-limiting example of a data area set in a storage unit of the information processing system in the exemplary embodiment.

With reference to FIGS. 10 through 11, a description is given below of an example of specific processing performed by the information processing system 1 (the information processing apparatus 3) in the exemplary embodiment. FIG. 10 is a diagram showing an example of a data area set in a storage unit (the memory 8) of the information processing system 1 in the exemplary embodiment. As shown in FIG. 10, the memory 8 of the information processing apparatus 3 has a program storage area 31, an operation data storage area 33, and a processing data storage area 36. It should be noted that the memory 8 stores, as well as data shown in FIG. 10, data of an image to be output to the display unit 4 and an image used to generate the image to be output, and the like.

In the program storage area 31, an information processing program 32 is stored. The information processing program 32 is a program to be executed by a computer (the CPU 7) of the information processing apparatus 3. It should be noted that the information processing program 32 is stored in a program storage unit (a storage device, a storage medium, or the like) accessible by the information processing apparatus 3 and provided inside or outside the information processing apparatus 3. Some or all of the information processing program 32 stored in the program storage unit is loaded at appropriate timing, is stored in the memory 8, and is executed by the CPU 7. Alternatively, some or all of the information processing program 32 may be stored in advance (for example, as a library) in the information processing apparatus that executes the information processing program 32.

In the operation data storage area 33, operation data transmitted from the terminal apparatus 2 is stored. In the exemplary embodiment, in the operation data storage area 33, operation unit output data 34 and sensor output data 35 are stored as the operation data. The operation unit output data 34 is data output from the operation unit 5, and represents an operation performed on the operation unit 5. The sensor output data 35 is data output from the inertial sensor 6, and represents the result of the detection by the inertial sensor 6. In the exemplary embodiment, the terminal apparatus 2 repeatedly transmits operation data to the information processing apparatus 3 once every predetermined time. In accordance with this, the information processing apparatus 3 sequentially receives operation data. The information processing apparatus 3 stores the received operation data in the operation data storage area 33 of the memory 8.

In the processing data storage area 36, various data is stored that is used for the information processing to be performed by the information processing apparatus 3 (the information processing shown in FIG. 11). In the processing data storage area 36, the following are stored: orientation data 37; display range data 38; reference range data 39; threshold data 40; and object data 41. The memory 8 stores, as well as the above data, data to be used for the information processing to be performed by the information processing apparatus 3 (FIG. 11).

The orientation data 37 is data representing the orientation of the terminal apparatus 2. The orientation data 37 is generated on the basis of the sensor output data 35. It should be noted that the orientation of the terminal apparatus 2 is represented in a three-dimensional manner (for example, by a three-dimensional vector) in the exemplary embodiment, but may be represented in a two-dimensional manner.

The display range data 38 is data representing the display range. The display range data 38 may be any information that enables the determination of the display range. For example, the display range data 38 may represent setting data regarding the virtual camera 14 (the orientation, the direction of the line of sight, and/or the range of field of view, and the like). Further, the reference range data 39 is data representing the reference range. Similarly to the display range data 38, the reference range data 39 may be any information that enables the determination of the display range. The reference range data 39 is determined in advance by the information processing program 32.

The threshold data 40 represents the threshold used in the orientation determination described above. In the exemplary embodiment, the threshold data 40 is set so as to represent the second threshold in the first state, and represent the first threshold in the second state.

The object data 41 is data regarding the objects arranged in the predetermined area. Specifically, the object data 41 represents the positions of the objects in the predetermined area. Further, the object data 41 may represent the types of processing (the applications) associated with the objects.

(3-2) Specific Example of Information Processing

Next, the detailed flow of the information processing according to the exemplary embodiment is described. FIG. 11 is a flow chart showing an example of the flow of the information processing performed by the CPU 7 of the information processing apparatus 3 in the exemplary embodiment. In the exemplary embodiment, when the information processing system 1 has been started, the CPU 7 of the information processing apparatus 3 initializes the storage units of the memory 8 and the like, and loads the information processing program 32 from the program storage unit into the memory 8. Then, the CPU 7 starts the execution of the information processing program 32.

It should be noted that the processes of all the steps in the flow chart shown in FIG. 11 are merely illustrative. Thus, the processing order of the steps may be changed, or another process may be performed in addition to (or instead of) the processes of all the steps, so long as similar results are obtained. Further, in the exemplary embodiment, descriptions are given on the assumption that the CPU 7 performs the processes of all the steps in the flow chart. Alternatively, a processor or a dedicated circuit other than the CPU 7 may perform the processes of some of the steps in the flow chart.

In the exemplary embodiment, first, in step S1, the CPU 7 performs an initial process. In the exemplary embodiment, the initial process includes the process of arranging the objects in the predetermined area, and the process of initializing various information (data) to be used in the processing shown in FIG. 11. The objects are arranged by the method described above in, for example, "(2-6) Arrangement of Objects in Predetermined Area". In specific processing, the CPU 7 stores data representing the position of each object as the object data 41 in the memory 8. Further, in step S1, the CPU 7 stores data representing the first threshold as the threshold data 40 in the memory 8. That is, in the exemplary embodiment, the threshold is set on the assumption that the terminal apparatus 2 is in the second state at the start of the processing. It should be noted that, in another embodiment, the threshold may be set on the assumption that the terminal apparatus 2 is in the first state at the start of the processing.

In step S2, the CPU 7 calculates the orientation of the terminal apparatus 2 (the display unit 4). In the exemplary embodiment, the orientation of the terminal apparatus 2 is calculated on the basis of the result of the detection by the inertial sensor 6. A specific method of calculating the orientation may be any method. If the inertial sensor 6 is, for example, a gyro sensor and/or an acceleration sensor, the orientation may be calculated by a well-known method using the results of the detection by these sensors. In specific processing, the CPU 7 calculates the orientation on the basis of the sensor output data 35 read from the memory 8. Then, the CPU 7 stores data representing the calculated orientation as the orientation data 37 in the memory 8.

In step S3, the CPU 7 determines whether or not the orientation of the terminal apparatus 2 (the display unit 4) is in the first state (is in the first state or in the second state). The determination of step S3 is made by, for example, the determination method described above in "(2-3) Orientation Determination". In specific processing, the CPU 7 reads the orientation data 37 and the threshold data 40 from the memory 8, and makes a determination on the basis of the read data. If the result of the determination of step S3 is affirmative, the CPU 7 performs the process of step S6 described later. If, on the other hand, the result of the determination of step S3 is negative, the CPU 7 performs the process of step S4.

In step S4, the CPU 7 sets the reference range as the display range. Specifically, the CPU 7 stores the reference range data 39 as the display range data 38 in the memory 8. In the subsequent step S5, the CPU 7 sets the first threshold as the threshold to be used in the orientation determination. That is, the CPU 7 stores data representing the first threshold as the threshold data 40 in the memory 8. After step S5, the CPU 7 performs the process of step S10 described later.

In step S6, the CPU 7 determines whether or not the orientation of the terminal apparatus 2 is substantially stopped during a predetermined period. The determination of step S6 is made by, for example, the determination method described above in "(2-5) Display Range in First State". In specific processing, the CPU 7 reads the orientation data 37 from the memory 8, and makes a determination on the basis of the read orientation data 37. If the result of the determination of step S6 is affirmative, the CPU 7 performs the process of step S9 described later. If, on the other hand, the result of the determination of step S6 is negative, the CPU 7 performs the process of step S7.

In step S7, the CPU 7 sets the display range in accordance with the orientation of the terminal apparatus 2. The setting of the display range is performed by the methods described in "(2-1) Display Range Control Function Based on Orientation of Terminal Apparatus 2" and "(2-5) Display Range in First State". In specific processing, the CPU 7 reads the orientation data 37 from the memory 8, and calculates the display range on the basis of the read orientation data 37. Then, the CPU 7 stores data representing the calculated display range as the display range data 38 in the memory 8.

In step S8, the CPU 7 sets the second threshold as the threshold to be used in the orientation determination. That is, the CPU 7 stores data representing the second threshold as the threshold data 40 in the memory 8. After step S8, the CPU 7 performs the process of step S11 described later.

On the other hand, In step S9, the CPU 7 sets the reference range as the display range. The process of step S9 is the same as the process of the above step S4.

In step S10, the CPU 7 causes the information presentation objects to move. The movement of the information presentation objects is performed by, for example, the method described above in "(2-6) Arrangement of Objects in Predetermined Area". In specific processing, the CPU 7 reads the object data 41 of the information presentation objects from the memory 8, and updates the positions of the information presentation objects. Then, the CPU 7 stores data representing the updated positions as the object data 41 in the memory 8. After step S10, the CPU 7 performs the process of step S11 described later.

In step S11, the CPU 7 performs information processing based on an input to the operation unit 5. Specifically, the CPU 7 receives one of the operations (inputs) (a) through (c) described above in "(2-7) Input to Operation Unit", and performs the processing based on the received input.

In step S12, the CPU 7 causes an image of the display range to be displayed on the display unit 4. Specifically, the CPU 7 reads the display range data 38 from the memory 8, generates an image of, in the predetermined area, an area corresponding to the display range, and outputs the generated image to the display unit 4 (transmits the generated image to the terminal apparatus 2). This results in causing the display unit 4 to display the image. It should be noted that, although not shown in FIG. 11, if, for example, an input for selecting an object has been provided, an image different from that of the predetermined area may be displayed on the display unit 4 as a result of starting the execution of the application associated with the selected object. The repeated performance of the above step S12 may cause the display range to move (scroll), or cause the information presentation objects to move when displayed.

In step S13, the CPU 7 determines whether or not the processing is to be ended. This determination may be made in any manner, and may be made on the basis of, for example, whether or not the user has given a predetermined instruction to end the processing. If the result of the determination of step S13 is negative, the CPU 7 performs the process of step S2 again. If, on the other hand, the result of the determination of step S13 is affirmative, the CPU 7 ends the information processing shown in FIG. 11. Thereafter, the CPU 7 repeatedly performs a series of processes of steps S2 through S13 until it is determined in step S13 that the processing is to be ended. This is the end of the description of the information processing shown in FIG. 11.

[4. Variations]

(Variations of Display Range in Second State)

In the above embodiment, in the second state, the reference range determined in advance is set as the display range. Here, the display range in the second state is not limited to the reference range. For example, in another embodiment, the information processing system 1 may set the display range in the second state on the basis of the display range in the first state before making a transition to the second state. For example, the display range in the second state may be set to the display range immediately before the first state makes a transition to the second state (or at a predetermined time before the transition). On the basis of the above, the user can easily perform the operation of causing a desired display range to be fixedly displayed. For example, even if the user's arms become tired when the user has been viewing some display range in the first state, the user can continue to view the same display range by putting down the terminal apparatus 2.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the exemplary embodiment can be used for, for example, a game system, a game apparatus, a game program, and the like in order, for example, to improve the operability of the operation of changing a display range in accordance with the orientation of an apparatus.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A portable display apparatus comprising:

a display unit;

an orientation sensor configured to detect an orientation of the display unit; and a processing system, comprising at least one processor, the processing system coupled to the display unit and the orientation sensor and being at least configured to:

scroll an image display range of an image, displayed in the display unit, in accordance with rotation of the display unit about a first axis extending in a vertical direction, and switch scroll control between an enabled state and a disabled state in accordance with the rotation of the display unit about a second axis extending perpendicularly to the vertical direction, wherein when a screen of the display unit is generally parallel to the first axis extending in a vertical direction, the scroll control is set to the enabled state to scroll the image display range to be displayed in the display unit so as to move in accordance with the rotation of the display unit about the first axis extending in the vertical direction, and when the screen of the display unit is rotated about the second axis and transitions from being generally parallel to the first axis extending in the vertical direction to being horizontal and directed upward, the scroll control is set to the disabled state to stop the scrolling of the image display range even with a change in rotation of the display unit about the first axis extending in the vertical direction or about the second axis, and display in the display unit predetermined range of the image without scrolling.

2. The portable display apparatus according to claim 1, wherein, when the screen of the display unit transitions from being generally parallel to the first axis to being horizontal and directed upward, the scrolling is stopped even when the display unit is not maintained at a constant orientation.

3. The portable display apparatus according to claim 1, wherein, when the screen of the display unit transitions from being generally parallel to the first axis to being horizontal and directed upward, the scrolling is stopped and the displayed predetermined range is an image of a display range displayed on the display unit when the scrolling is stopped.

4. The portable display apparatus according to claim 1, wherein when the screen of the display unit transitions from being generally parallel to the first axis to being horizontal and directed upward, the scrolling is stopped and the displayed predetermined range is an image of display range displayed on the display unit a predetermined time before the transition.

5. A computer-readable non-transitory storage medium having stored therein an information processing program to be executed by a computer of an information processing apparatus, the information processing program causing the computer to execute:
   determining whether an orientation of a display unit capable of being held by a user is in a first state or in a second state, wherein at least when a screen of the display unit is parallel to a first axis extending in the vertical direction, the orientation of the display unit is determined to be in the first state, and at least when the screen of the display unit is parallel to a second axis extending perpendicularly to the vertical direction and directed vertically upward, the orientation of the display unit is determined to be in the second state;
   scrolling an image display range of an image, displayed in the display unit in accordance with rotation of the display unit about the first axis; and
   switching scroll control between being enabled and disabled in accordance with the rotation of the display unit about the second axis extending perpendicularly to the vertical direction, wherein
   if it has been determined that the orientation of the display unit is in the first state, the scroll control is enabled to set the image display range to be displayed in the display unit by moving in a left-right direction in accordance with the rotation of the display unit about the first axis extending in the vertical direction, and if it has been determined that the display unit is rotated about the second axis and the orientation of the display unit is in the second state, the scroll control is disabled to set the image display range, regardless of a change in the rotation of the display unit about the vertical direction or the horizontal direction in the second state.

6. The storage medium according to claim 5, wherein
   if the orientation of the display unit has changed from the first state to the second state, a reference range determined in advance is set as the display range.

7. The storage medium according to claim 6, wherein
   if the orientation of the display unit has changed from the second state to the first state, a range that is substantially the same as the reference range is set as an initial display range.

8. The storage medium according to claim 5, the information processing program further causing the computer to execute
   if the orientation of the display unit is in the first state, determining whether or not the orientation of the display unit is substantially stopped during a predetermined period, wherein
   if it has been determined that the orientation of the display unit is substantially stopped during the predetermined period, a reference range determined in advance is set as the display range.

9. The storage medium according to claim 5, the information processing program further causing the computer to execute:
   arranging a plurality of objects in a predetermined area of the image in a predetermined direction such that the objects included in the display range are changed in accordance with movement of the display range in the left-right direction; and
   if an operation of specifying one of the objects displayed on the display unit has been performed, performing processing based on the specified object.

10. The storage medium according to claim 5, the information processing program further causing the computer to execute
    if it has been determined that the orientation of the display unit is in the second state, causing at least some of a plurality of objects arranged in a predetermined area of the image to move, and if it has been determined that the orientation of the display unit is in the first state, stopping movement of the at least some objects.

11. The storage medium according to claim 5, wherein
    using a magnitude relationship between a value representing a direction of the screen of the display unit and a threshold, it is determined whether the orientation is in the first state or in the second state, and
    the threshold is set to a value varied depending on the first state and the second state such that a range of the orientation where the first state is maintained in the first state and a range of the orientation where the second state is maintained in the second state partially overlap each other.

12. The storage medium according to claim 5, wherein
    a casing including the display unit further includes an operation unit,
    the information processing program further causes the computer to execute under the condition that the orientation of the display unit is in the second state, performing information processing based on a predetermined input to the operation unit.

13. The storage medium according to claim 5, wherein
    the display range is set such that, if it has been determined that the orientation of the display unit is in the first state, the display range changes in accordance with a change in the orientation of the display unit, and if it has been determined that the orientation of the display unit is in the second state, the display range does not change in accordance with a change in the orientation of the display unit.

14. The storage medium according to claim 5, wherein
    a casing including the display unit further includes an inertial sensor,
    the information processing program further causes the computer to execute calculating the orientation of the display unit on the basis of an output of the inertial sensor.

15. The storage medium according to claim 5, wherein
    the display unit is included in a terminal apparatus separate from, and capable of communicating with, the information processing apparatus.

16. The storage medium according to claim 5, wherein
    the information processing apparatus is capable of being held by a user and includes the display unit.

17. The storage medium according to claim 5, wherein when it is determined that the orientation of the display unit transitions from being in the first state to being in the second state, the display range movement in the left-right direction is stopped and a display range, displayed on the screen when transitioning to the second state, is displayed on the screen regardless of the change in the orientation of the display unit until the user input is received to change the displayed display range.

18. An information processing apparatus comprising:
an orientation determination unit configured to determine whether an orientation of a display unit capable of being held by a user is in a first state or in a second state, wherein at least when a screen of the display unit is parallel to a first axis extending in a vertical direction, the orientation of the display unit is determined to be in the first state, and at least when the screen of the display unit is parallel to a second axis extending perpendicularly to the vertical direction and directed vertically upward, the orientation of the display unit is determined to be in the second state; and
a display range setting unit configured to:
scroll an image display range of an image, displayed in the display unit, in accordance with rotation of the display unit about the first axis; and
switch scroll control between being enabled and disabled in accordance with the rotation of the display unit about the second axis, wherein
if it has been determined that the orientation of the display unit is in the first state, the scroll control is enabled to set, by moving in a left-right direction, the image display range to be displayed in the display unit, in accordance with the rotation of the display unit about the first axis extending in the vertical direction, and if it has been determined that the display unit is rotated about the second axis and the orientation of the display unit is in the second state, the scroll control is disabled to set the image display range, regardless of a change in the rotation of the display unit about the vertical direction or the horizontal direction in the second state.

19. An information processing system comprising:
a display unit capable of being held by a user; and
an information processing device, comprising at least one processor, the information processing device coupled to the display unit and being at least configured to:
determine whether an orientation of the display unit capable of being held by the user is in a first state or in a second state, wherein at least when a screen of the display unit is parallel to a first axis extending in a vertical direction, the orientation of the display unit is determined to be in the first state, and at least when the screen of the display unit is parallel to a second axis extending perpendicularly to the vertical direction and directed vertically upward, the orientation of the display unit is determined to be in the second state;
scroll an image display range of an image, displayed in the display unit, in accordance with rotation of the display unit about the first axis; and
switch scroll control between being enabled and disabled in accordance with the rotation of the display unit about the second axis, wherein
if it has been determined that the orientation of the display unit is in the first state, the scroll control is enabled to set, by moving in a left-right direction, the image display range to be displayed in the display unit, in accordance with the rotation of the display unit about the first axis extending in the vertical direction, and if it has been determined that the display unit is rotated about the second axis and the orientation of the display unit is in the second state, the scroll control is disabled to set the image display range, regardless of a change in the rotation of the display unit about the vertical direction or the horizontal direction in the second state.

20. The information processing system according to claim 19, further comprising a touch panel, and wherein if it has been determined that the orientation of the display unit is in the second state, the display range is set in accordance with a direction of a user input on the touch panel.

21. The information processing system according to claim 19, further comprising a directional input device, and wherein if it has been determined that the orientation of the display unit is in the second state, the display range is set based on a user input to the directional input device, regardless of change in orientation of the display unit.

22. An image display method for displaying an image in a display unit capable of being held by a user, the method comprising:
determining whether an orientation of the display unit is in a first state or in a second state, wherein at least when a screen of the display unit is parallel to a first axis extending in a vertical direction, the orientation of the display unit is determined to be in the first state, and at least when the screen of the display unit is parallel to a second axis extending perpendicularly to the vertical direction and directed vertically upward, the orientation of the display unit is determined to be in the second state;
scrolling an image display range of the image in accordance with rotation of the display unit about the first axis; and
switching scroll control between being enabled and disabled in accordance with the rotation of the display unit about the second axis, wherein
if it has been determined that the orientation of the display unit is in the first state, the scroll control is enabled to set the image display range to be displayed in the display unit by moving in a left-right direction in accordance with the rotation of the display unit about the first axis extending in the vertical direction, and if it has been determined that the display unit is rotated about the second axis and the orientation of the display unit is in the second state, the scroll control is disabled to set the image display range, regardless of a change in the rotation of the display unit about the vertical direction or the horizontal direction in the second state.

23. A portable display apparatus comprising:
a display;
a sensor configured to detect an orientation of the display; and
a processing system, comprising at least one processor, the processing system coupled to the display and the sensor and being at least configured to:
scroll an image display range of an image, displayed on the display, in accordance with rotation of the display about a first axis extending in a vertical direction; and
switch scroll control between an enabled state and a disabled state in accordance with the rotation of the display about a second axis extending perpendicularly to the vertical direction, wherein
when the display is determined, based on the detected orientation of the display, to be generally parallel to the first axis, the scroll control is set to the enabled state to scroll the image in accordance with a change of the detected orientation of the display about the first axis, and when the display is determined, based on the detected orientation of the display, to rotate about the second axis and to transition from being generally parallel to the first axis to being horizontal and directed upward, the scroll control is set to the disabled state to stop the scrolling of the image displayed on the display and displaying a predetermined range of the image so that there is no scrolling of the image even when a change of orientation of the display about the first axis is detected and when a change of orientation of the display about the second axis is detected.

24. The portable display apparatus of claim 23 wherein the processing system is further configured to, when the display is in the horizontal direction and directed upward, receiving a user input and scrolling the displayed image based on the received user input regardless of changes to the orientation of the display.

25. The portable display apparatus of claim 23 wherein, when the screen of the display transitions from being generally parallel to the first axis to being horizontal and directed upward, the scrolling is stopped even when the display is not maintained at a constant orientation.

\* \* \* \* \*